Oct. 14, 1958   M. J. GALLA, SR   2,856,227
AUTOMOBILE BODY MOUNTING
Filed Dec. 31, 1953   2 Sheets-Sheet 1

INVENTOR
Michael J. Galla Sr.
BY
ATTORNEY

Oct. 14, 1958  M. J. GALLA, SR  2,856,227
AUTOMOBILE BODY MOUNTING
Filed Dec. 31, 1953  2 Sheets-Sheet 2

INVENTOR
Michael J. Galla Sr.
BY
L. D. Bush
ATTORNEY

United States Patent Office 2,856,227
Patented Oct. 14, 1958

2,856,227

AUTOMOBILE BODY MOUNTING

Michael J. Galla, Sr., Royal Oak, Mich., assignor to General Motors Corporation, Detroit, Mich., a corporation of Delaware Application December 31, 1953, Serial No. 401,461

2 Claims. (Cl. 296—35)

The present invention relates to automobiles and more particularly to means for resiliently mounting the body on the chassis.

In order to prevent the transmission of engine noises and road vibrations into the passenger compartment of an automotive vehicle, it is desirable to acoustically insulate the body from the chassis. One means of accomplishing this objective is to support the body on a plurality of resilient cushions of sound absorbent material such as rubber. In the past these cushions have been placed on the frame or a bracket projecting therefrom so that the body rests on the cushion. Bolts or other suitable means are employed for compressing the cushion and holding the body in position. This cushion normally is in compression when it supports the body and it is in shear when the body moves laterally on the chassis. Thus when the cushions are made sufficiently resilient to provide adequate insulation, the body will tend to sway laterally on the chassis, and if the cushions are made sufficiently stiff to prevent lateral sway, excessive noises will be transmitted into the passenger compartment. Although numerous reinforcing means have been employed for providing lateral stiffness in a body mounting without altering its resilience and acoustical qualities, they have generally proved to be expensive and not entirely satisfactory.

It is now proposed to provide a body mounting which will be economical to manufacture and which will provide adequate acoustical insulation without permitting lateral sway of the body on the chassis. This is to be accomplished by employing a body mounting that projects from the frame and has an inclined face thereon. This face forms a seat for a resilient cushion consisting of a sound absorbent material such as rubber. A similarly inclined face on the body rests on the cushion so as to be resiliently supported by the bracket.

Figure 1:
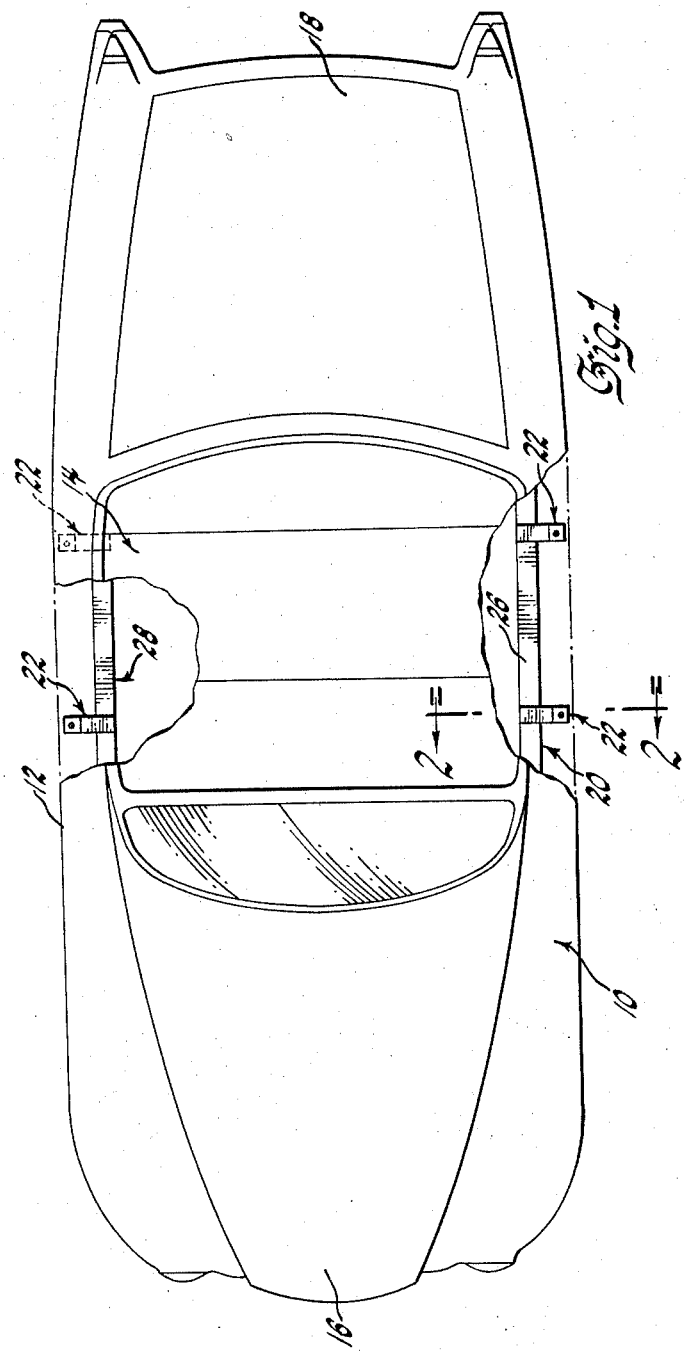
Fig. 1 is a plan view of an automotive vehicle, a portion thereof being broken away to show the body mounting employing the present invention.
Figure 2:
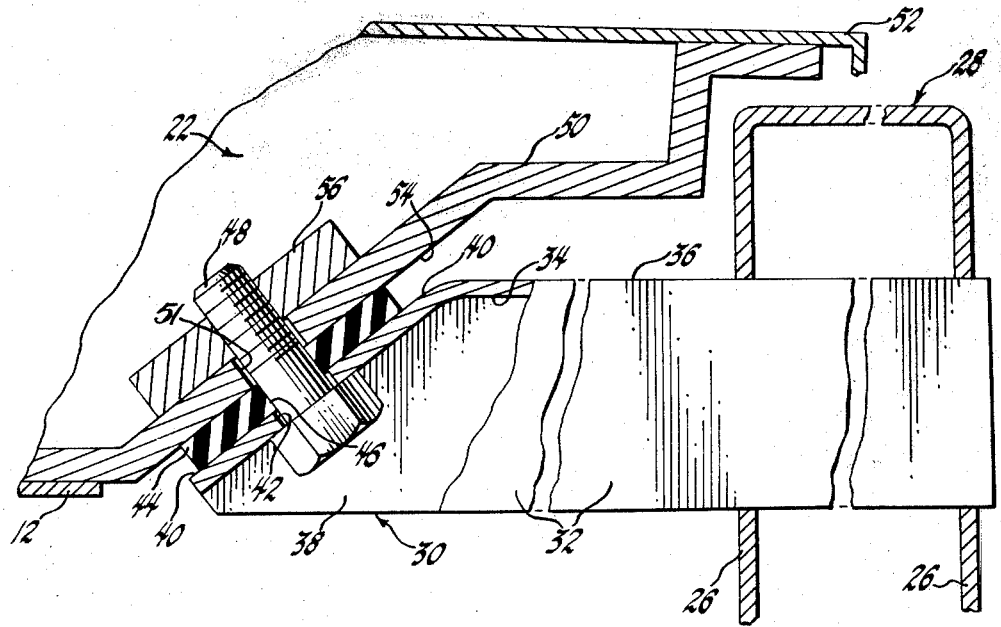
Fig. 2 is a cross sectional view taken substantially along the plane of line 2—2 in Fig. 1 and showing a preferred form of the invention.

Referring to the drawings in more detail the present invention may be employed in a vehicle 10 having a body 12 with a passenger compartment 14 disposed between an engine hood 16 and a rear deck lid 18. The body 12 may be resiliently mounted on the chassis 20 by means of two sets of body mountings 22 that project outwardly from the opposite side rails 26 of the frame 28.

The mountings 22 include members 30 that project from the side rail 26 of the frame 28. In the present instance a box type frame is used which employs side rails 26 having a rectangular cross section. The members 30 may be positioned in openings through the side rails 26 so as to extend completely through the side rails and to project from both sides thereof. The members 30 may be secured in this position by any suitable means such as by welding them to the side rails 26. Although a member 30 of any suitable shape may be used, it has been found that a channel shape will provide adequate strength. Each channel 30 is preferably inverted so that the flanges 32 extend vertically downwardly and the web 34 forms a substantially horizontal planular surface 36 adjacent the side rails 26. The outer end of the web 34 may be angularly disposed with respect to the channel 30 so as to form an inclined surface that is substantially parallel to the longitudinal axis of the vehicle 10. In the present instance this surface slopes downwardly and forms an inclined seat 40 having a bolt hole 42 in the middle thereof.

A resilient cushion 44 of a suitable sound absorbent material such as rubber may be positioned on this seat 40. The cushion 44 preferably has an opening 46 in the center thereof to register with the bolt hole 42. A bolt 48 may be disposed in the bolt hole 42 so as to project through the opening 46 in the cushion 44 and retain it in position.

The body 12 may be provided with a bracket 50 that extends between the edge of the body 12 and the floor panel 52. This bracket 50 preferably has an inclined surface 54 in the center thereof which is substantially parallel to the surface 40 on the end of mounting 22. When the body 12 is properly positioned on the chassis 20 the bracket 50 will seat on the cushion 44 and be supported thereby. An enlarged nut 56 may be positioned on the back of the bracket 50 so that the bolt 48 may be threaded for compressing the cushion 44 therebetween. It can be seen that this cushion 44 will resiliently support the body 12 on the chassis 20, and by employing a sound absorbent material, the transmission of noises from the chassis 20 to the body 12 will be greatly reduced. It should be noted that since the cushions 44 are inclined inwardly the cushions 44 on the opposite sides of the vehicle 10 will be obliquely disposed with respect to each other. Since the cushions are also parallel to the longitudinal axis of the vehicle, if the body 12 tends to sway laterally with respect to the chassis 20, at least one of the cushions 44 will be compressed and resiliently resist the lateral sway. Accordingly, an unreinforced cushion may be employed without relying solely on the shear stress in the pad to prevent lateral sway.

As shown in the drawing, the cylindrical surface of the bolt hole 42 in the outer end 40 of web 34 is radially spaced from the surface of bolt 48 extending therethrough and is sufficiently larger in diameter than bolt 48 to allow movement of end 40 relative to bolt 48 in any direction in a plane parallel to the surface of end 40, which is parallel to cushion 44. The bolt receiving opening 51 in bracket 50 is similarly formed to allow similar movement of bracket 50. Opening 46 of cushion 44 fits snugly about bolt 48 to prevent relative movement of cushion 44 to bolt 48.

Figure 3:
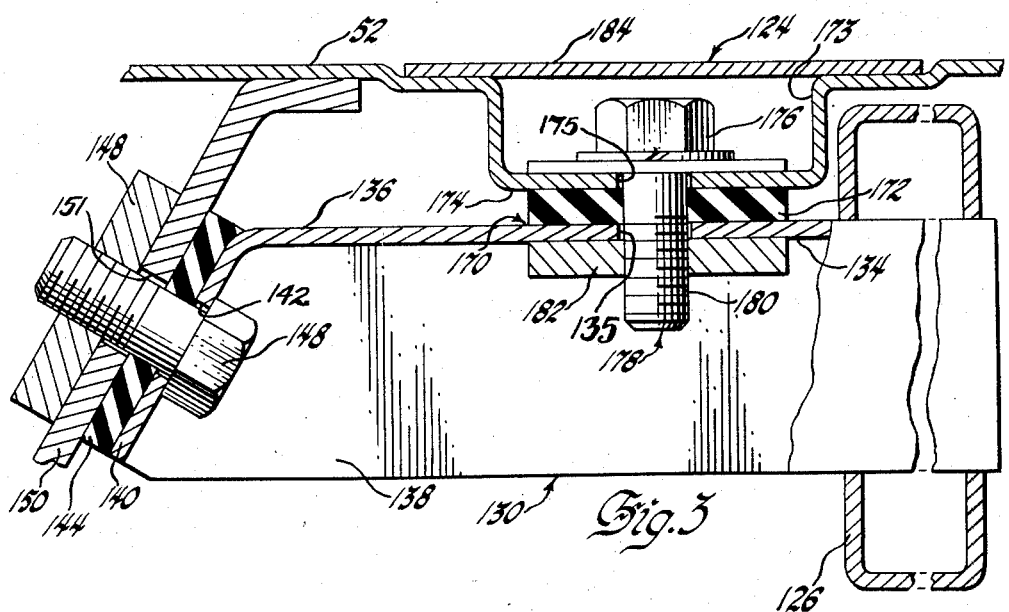
Fig. 3 is a cross sectional view of a modified structure similar to that shown by Figure 2.

If it is desired to provide additional vertical support for the body 12, the modification shown in Fig. 3 may be employed. In this embodiment an inverted channel 130 is provided which extends through the side rails 126 as in the preferred embodiment. The channel 130 has a substantially horizontal planular surface 136 formed by the web 134 and the end 138 is inclined so as to provide a downwardly inclined surface or seat 140 similar to that of the preferred embodiment. The seat 140 is adapted to cooperate with the inclined bracket 150 that extends between the body 12 and the floor 52. The bracket 150 is resiliently supported by an inclined cushion 144 disposed on the seat 140. This seat is provided with a bolt receiving aperture 142 which is substantially larger in diameter than the bolt received therethrough. Bracket 150 is also provided with a bolt receiving aperture having an enlarged diameter in like manner. Bracket 150 is held in position by a nut and bolt assembly 148 which extends through apertures 142 and 151 of seat 140 and bracket 150 respectively, as well as through aperture 146 of cushion 144. Aperture 146 is preferably so dimensioned as to provide a snug fit about the bolt of assembly 148. In addition to this seat 140 the top of the web 134 may have a second horizontal seat 170 formed thereon. Although the second seat 170 may be on either side of the side rail 126, in the present instance it is disposed between the side rail 126 and the end seat 140. A resilient cushion 172 of sound absorbent material similar to the other cushions 44 and 144 may rest on this seat 170. A depressed pocket 173 may be provided in the floor 52 so that the bottom 174 thereof will rest on the cushion 172. The head 176 of a bolt 178 may be positioned in this pocket 173 so that the shank 180 thereof will extend downwardly through both the cushion 172 and channel 130. As shown in Figure 3, bolt 178 is assembled through enlarged openings 175 and 135 in bottom 174 and web 134 which allow movement of bottom 174 and web 134 in a plane parallel to cushion 172 and relative thereto. Cushion 172 fits snugly about bolt 178 to prevent relative motion thereto. Thus when the nut 182 is tightened the cushion 172 will be compressed between the floor 52 and channel 130 so as to support the body 12. If desired a cover 184 may be provided to close the top of the pocket 173 and conceal the bolt 178. It may be seen that by employing a horizontal seat 170 enough vertical support may be obtained to permit the end cushion 144 to be more nearly vertical. This in turn will increase the lateral stiffness while still providing the desired sound deadening characteristics.

It is to be understood that, although the invention has been described with specific reference to particular embodiments thereof, it is not to be so limited since changes and alterations therein may be made which are within the full intended scope of this invention as defined by the appended claims.

What is claimed is:

1. In a mount for supporting a vehicle body on a chassis, a frame member, a horizontal support secured to said frame member and projecting transversely therefrom, said support having a planar surface inclined at an acute angle to the horizontal and in a plane substantially parallel to the longitudinal axis of said frame member, a vehicle body adapted for mounting on said support, said body including a depending inclined mounting bracket having a surface in parallel spaced relation to the inclined surface of said support, a yieldable cushion freely mounted between said parallel inclined surfaces, a bolt passing through said surfaces and securing said cushion therebetween, bolt receiving apertures formed in said parallel inclined surfaces and said cushion, the apertures in said inclined surfaces having diameters substantially greater than the diameter of said bolt and the aperture in said cushion snugly fitting said bolt, whereby when said body is mounted on said chassis each of said inclined surfaces may have a component of motion transverse to the axis of said bolt while moving relative to said cushion, said inclined surfaces being adapted to allow said cushion to expand freely in any direction parallel to said surfaces.

2. The mount described in claim 1 in which said support has a horizontal surface and said body has a generally channel shaped longitudinally extending surface depending therefrom and including a web portion parallel to the horizontal surface of said support, bolt receiving apertures in said web and said horizontal surface, a second cushion secured between said web and said horizontal surface and having a bolt receiving aperture axially aligned with the bolt receiving apertures in said web and said horizontal surface, and bolt means extending through said apertures to fasten said web and said support together, said web and said surface apertures having diameters larger than the diameter of said bolt means and said cushion aperture tightly fitting said bolt means to accommodate movement of said web and said horizontal surface relative and parallel to said second cushion.

References Cited in the file of this patent

UNITED STATES PATENTS

| 131,471 | Singleton | Sept. 17, 1872 |
| 1,811,923 | Flintermann | June 30, 1931 |
| 2,171,947 | Parker | Sept. 5, 1939 |
| 2,198,672 | Lee | Apr. 30, 1940 |
| 2,207,848 | Barrows | July 16, 1940 |
| 2,485,794 | Waterbury et al. | Oct. 25, 1949 |

FOREIGN PATENTS

| 15,402 | Australia | Aug. 20, 1929 |
| 439,512 | France | Apr. 11, 1912 |
| 253,250 | Great Britain | June 17, 1926 |
| 313,340 | Great Britain | June 13, 1929 |
| 514,391 | Great Britain | Nov. 7, 1939 |